United States Patent
Zongmin

(10) Patent No.: US 9,612,683 B2
(45) Date of Patent: Apr. 4, 2017

(54) OPERATION METHOD OF TOUCH SCREEN WITH ZOOMING-IN FUNCTION AND TOUCH SCREEN DEVICE

(71) Applicant: HUIZHOU TCL MOBILE COMMUNICATION CO., LTD., Huizhou, Guangdong (CN)

(72) Inventor: Ye Zongmin, Huizhou (CN)

(73) Assignee: Huizhou TCL Mobile Communication Co., Ltd., Huizhou (CN)

(*) Notice: Subject to any disclaimer, the term of this patent is extended or adjusted under 35 U.S.C. 154(b) by 44 days.

(21) Appl. No.: 14/435,862

(22) PCT Filed: Apr. 4, 2014

(86) PCT No.: PCT/CN2014/074820
§ 371 (c)(1),
(2) Date: Apr. 15, 2015

(87) PCT Pub. No.: WO2015/081646
PCT Pub. Date: Jun. 11, 2015

(65) Prior Publication Data
US 2016/0034101 A1    Feb. 4, 2016

(30) Foreign Application Priority Data

Dec. 4, 2013 (CN) .......................... 2013 1 0648552

(51) Int. Cl.
 G06F 3/041 (2006.01)
 G06F 3/0484 (2013.01)
 G06F 3/0488 (2013.01)

(52) U.S. Cl.
 CPC .......... G06F 3/0418 (2013.01); G06F 3/0488 (2013.01); G06F 3/04845 (2013.01);
 (Continued)

(58) Field of Classification Search
 CPC ...... G06F 3/0416; G06F 3/0418; G06F 3/048; G06F 3/0481; G06F 3/0484;
 (Continued)

(56) References Cited

U.S. PATENT DOCUMENTS 8,525,854 B2 * 9/2013 Murakami ............ G06F 3/0485
345/660
2011/0109581 A1    5/2011 Ozawa et al.
(Continued)

FOREIGN PATENT DOCUMENTS

CN    101354618 A    1/2009
CN    101937302 A    1/2011
(Continued)

OTHER PUBLICATIONS

English Abstract of CN103616973 A.
(Continued)

*Primary Examiner* — Nathan Danielsen
(74) *Attorney, Agent, or Firm* — Ladas & Parry LLP

(57) ABSTRACT

An operation method of a touch screen and a touch screen device are provided by the present disclosure, and the method comprises: acquiring an input trajectory on the screen firstly; then determining whether the input trajectory is consistent with a predetermined trajectory; zooming in a target region on the screen that corresponds to a current touch point of a touch medium if the determination result is "yes"; detecting in the zoomed-in target region a touch-screen operation instruction; and executing a corresponding operation according to the touch-screen operation instruction. Thereby, the present disclosure can reduce occurrences of mis-touches in the process of operating the touch screen and make the touch screen very convenient to use by the user.

13 Claims, 2 Drawing Sheets

(52) U.S. Cl.
CPC ............... *G06F 3/04883* (2013.01); *G06F 2203/04805* (2013.01); *G06F 2203/04806* (2013.01)

(58) Field of Classification Search
CPC ............ G06F 3/04845; G06F 3/0485; G06F 3/04855; G06F 3/0488; G06F 3/04883; G06F 2203/04805; G06F 2203/04806
See application file for complete search history.

(56) References Cited

U.S. PATENT DOCUMENTS

| | | | |
|---|---|---|---|
| 2013/0038544 A1* | 2/2013 | Park | G06F 3/0488 345/173 |
| 2013/0293503 A1 | 11/2013 | Zhou et al. | |
| 2014/0082559 A1 | 3/2014 | Suggs | |
| 2014/0108928 A1* | 4/2014 | Mumick | G06F 3/0488 715/716 |
| 2014/0195967 A1* | 7/2014 | Abe | G06F 3/04883 715/798 |
| 2016/0034101 A1 | 2/2016 | Zongmin | |

FOREIGN PATENT DOCUMENTS

| | | |
|---|---|---|
| CN | 102541325 A | 7/2012 |
| CN | 102855074 A | 1/2013 |
| CN | 103150116 A | 6/2013 |
| CN | 103176712 A | 6/2013 |
| CN | 103384872 A | 11/2013 |
| CN | 103616973 A | 3/2014 |
| WO | 2013/182141 A1 | 12/2013 |

OTHER PUBLICATIONS

English Abstract of WO 2013/182141 A1.
English Abstract of CN103150116 A.
English Abstract of CN103384872 A.
English Abstract of CN101937302 A.
English Abstract of CN102855074 A.
English Abstract of CN101354618 A.
English Abstract of CN102541325 A.
English translation of CN 103176712 A.

* cited by examiner

US 9,612,683 B2

OPERATION METHOD OF TOUCH SCREEN WITH ZOOMING-IN FUNCTION AND TOUCH SCREEN DEVICE

RELATED APPLICATION

This application is a national phase entry under 35 USC 371 of International Patent Application No PCT/CN2014/074820 filed on Apr. 4, 2014, which claims priority from Chinese Patent Application No. 22013106485529 filed on Dec. 4, 2013, the disclosures of which are incorporated in their entirety by reference herein.

FIELD OF THE INVENTION

The present disclosure relates to the technical field of electronic technologies, and more particularly, to an operation method of a touch screen and to a touch screen device.

BACKGROUND OF THE INVENTION

As compared with conventional keyboard input devices, the touch screen is a kind of new computer input device having such advantages as having a high response speed, saving space and easy to use. So far, the touch screen is known as the simplest and most straightforward means for human-machine interaction, and the user can execute a corresponding operation simply by slightly touching an icon or a text on the touch screen of a touch screen device. This makes the human-machine interaction more straightforward and very convenient for the user.

However, the touch screen still has the problem of insensitivity in response, so it is often the case that when a user using a touch screen device clicks on an application or a link, the target fails to be selected, and this makes the touch screen inconvenient to use. In the prior art, this is solved usually by improving quality of the touch screen or reasonably planning the layout of applications so as to improve accuracy of touch points. However, the prior art solutions can still not fundamentally solve the problem of mistouches.

SUMMARY OF THE INVENTION

The main technical problem to be solved by the present disclosure is to provide an operation method of a touch screen and a touch screen device, which can reduce occurrences of mis-touches in the process of operating the touch screen and make the touch screen very convenient to use by the user.

To solve the aforesaid technical problem, a technical solution adopted in the present disclosure is to provide an operation method of a touch screen, comprising: acquiring an input trajectory on the screen; determining whether the input trajectory is consistent with a predetermined trajectory; zooming in a target region that corresponds to a current touch point between a touch medium and the screen if the determination result is "yes"; detecting in the zoomed-in target region a touch-screen operation instruction indicating that the touch medium is leaving the screen; and executing a corresponding operation, which is triggered when a target object corresponding to the touch point before the touch medium leaves the screen is clicked, in the target region according to the touch-screen operation instruction indicating that the touch medium is leaving the screen; wherein the step of zooming in a target region that corresponds to a current touch point between the a touch medium and the screen, comprises: acquiring a circular target region that takes the touch point as an origin and has a preset radius on the screen, and acquiring a bitmap of the circular target region; and zooming in the bitmap of the circular target region at a preset scale and displaying the bitmap.

Preferably, after the step of zooming in a target region that corresponds to a current touch point between the a touch medium and the screen, the method further comprises: changing the target region with the change of the touch point between the touch medium and the screen as the touch medium moves on the screen, and zooming in the changed target region.

Preferably, after the step of zooming in a target region that corresponds to a current touch point between the touch medium and the screen, the method further comprises: restoring the zoomed-in target region into a normal displaying state of the screen when another input trajectory consistent with the predetermined trajectory is acquired as the touch medium keeps in touch with the screen.

To solve the aforesaid technical problem, another technical solution adopted in the present disclosure is to provide an operation method of a touch screen, comprising: acquiring an input trajectory on the screen; determining whether the input trajectory is consistent with a predetermined trajectory; zooming in a target region that corresponds to a current touch point between a touch medium and the screen if the determination result is "yes"; detecting a touch-screen operation instruction in the zoomed-in target region; and executing a corresponding operation according to the touch-screen operation instruction.

Preferably, the step of detecting a touch-screen operation instruction in the zoomed-in target region comprises: detecting in the zoomed-in target region the touch-screen operation instruction indicating that the touch medium is leaving the screen; the step of executing a corresponding operation according to the touch-screen operation instruction comprises: executing a corresponding operation, which is triggered when a target object corresponding to the touch point before the touch medium leaves the screen is clicked, in the target region according to the touch-screen operation instruction indicating that the touch medium is leaving the screen.

Preferably, the step of zooming in a target region that corresponds to a current touch point between a touch medium and the screen, comprises: acquiring a circular target region that takes the touch point as an origin and has a preset radius on the screen, and acquiring a bitmap of the circular target region; and zooming in the bitmap of the circular target region at a preset scale and displaying the bitmap.

Preferably, after the step of zooming in a target region that corresponds to a current touch point between a touch medium and the screen, the method further comprises: changing the target region with the change of the touch point between the touch medium and the screen as the touch medium moves on the screen, and zooming in the changed target region.

Preferably, after the step of zooming in a target region that corresponds to a current touch point between a touch medium and the screen, the method further comprises: restoring the zoomed-in target region into a normal displaying state of the screen when another input trajectory consistent with the predetermined trajectory is acquired as the touch medium keeps in touch with the screen.

To solve the aforesaid technical problem, another technical solution adopted in the present disclosure is to provide a touch screen device, comprising: a first acquiring module, being configured to acquire an input trajectory on the screen; a determining module, being configured to determine whether the input trajectory is consistent with a predetermined trajectory; a displaying module, being configured to zoom in a target region that corresponds to a current touch point between a touch medium and the screen if the determination result is "yes"; a second acquiring module, being configured to detect a touch-screen operation instruction in the zoomed-in target region; and an executing module, being configured to execute a corresponding operation according to the touch-screen operation instruction.

Preferably, the second acquiring module is configured to detect in the zoomed-in target region a touch-screen operation instruction indicating that the touch medium is leaving the screen; and the executing module is configured to execute a corresponding operation, which is triggered when a target object corresponding to the touch point before the touch medium leaves the screen is clicked, in the target region according to the touch-screen operation instruction indicating that the touch medium is leaving the screen.

Preferably, the displaying module comprises: an acquiring unit, being configured to acquire a circular target region that takes the touch point as an origin and has a preset radius on the screen, and acquiring a bitmap of the circular target region; and a zoom-in displaying unit, being configured to zoom in the bitmap of the circular target region at a preset scale and display the bitmap.

Preferably, the target region changes with the change of the touch point between the touch medium and the screen as the touch medium moves on the screen, and the displaying module is configured to zoom in the changed target region.

Preferably, the displaying module restores the zoomed-in target region into a normal displaying state of the screen when another input trajectory consistent with the predetermined trajectory is acquired as the touch medium keeps in touch with the screen.

The present disclosure has the following benefits: as compared to the prior art, the positioning method of the touch screen according to the present disclosure firstly acquires an input trajectory on the screen, then determines whether the input trajectory is consistent with a predetermined trajectory, zooms in a target region on the screen that corresponds to a current touch point of a touch medium if the determination result is "yes", detects a touch-screen operation instruction in the zoomed-in target region, and executes a corresponding operation according to the touch-screen operation instruction. By zooming in the target region corresponding to the touch point, the user can see the target object corresponding to the touch point more clearly so that whether the target object corresponding to the touch point is a desired object to be operated by the user can be determined more accurately, thus reducing occurrences of mis-touches.

DETAILED DESCRIPTION OF THE INVENTION

The present disclosure will be detailed with reference to the attached drawings and embodiments thereof.

Because of the sensitivity of the touch screen or a gesture angle of the user who is using the touch screen, problems such as difficult to hit a predetermined target are often caused. The present disclosure mainly simulates the effect of a magnifying lens, and zooms in the content displayed on the screen to reduce occurrences of mis-touches in the process of operating the touch screen by the user so as to improve the user experience.

Figure 1:
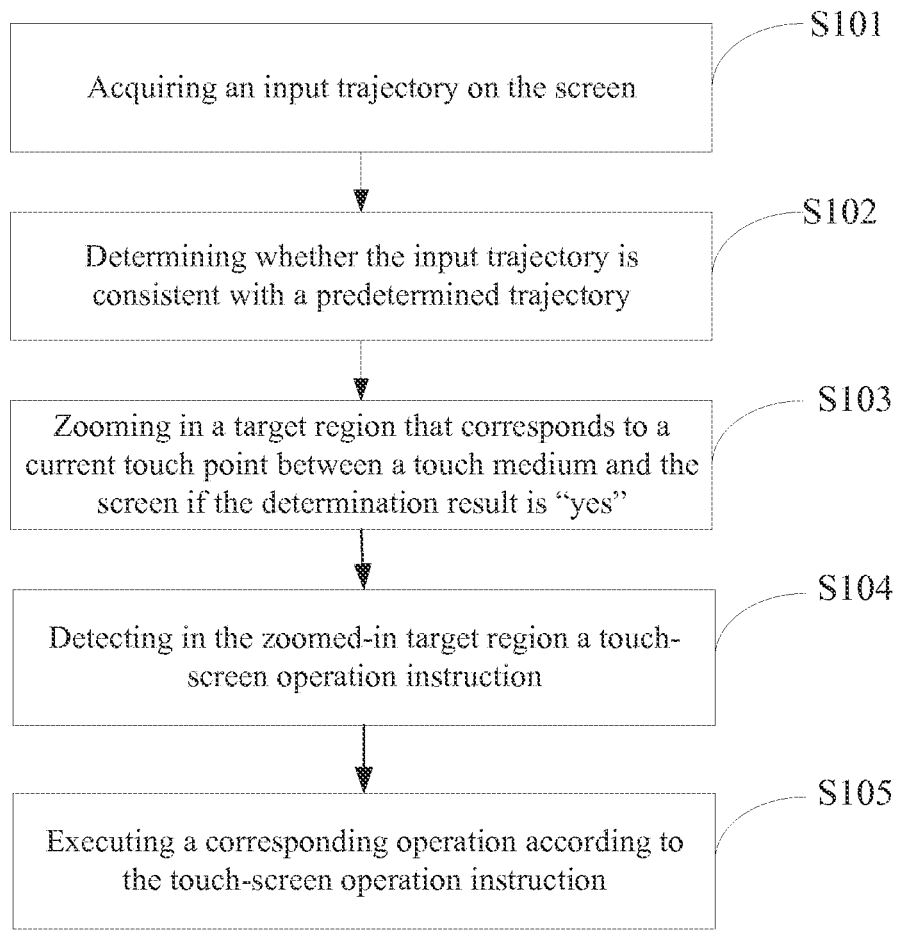
FIG. 1 is a flowchart diagram illustrating an embodiment of a positioning method of the touch screen of the present disclosure.

Referring to FIG. 1, an embodiment of a positioning method of a touch screen of the present disclosure comprises the following steps of:

step S101: acquiring an input trajectory on the screen;

step S102: determining whether the input trajectory is consistent with a predetermined trajectory; and step S103: zooming in a target region that corresponds to a current touch point of a touch medium and the screen if the determination result is "yes".

The predetermined trajectory is a preset hand gesture for "awaking" the magnifying lens application. The hand gesture is self-defined by the user, for example, it may be a circle, or a letter, and may also be a hand gesture defined by the system. Supposing that the predetermined trajectory is a circle, the touch screen device receives an input trajectory of the user, and determines whether the input trajectory is consistent with the predetermined trajectory. Then, the touch screen device zooms in a target region on the screen that corresponds to a current touch point of the touch medium if the determination result is "yes"; and otherwise, the zoom-in operation is performed.

Specifically, the coordinate on the screen of the current touch point of the touch medium (e.g., a finger or a touch pen) is acquired firstly. The coordinate value of the touch point can be acquired by calling a standard interface of the system in a manner well known in the art. Taking the Android system as an example, onTouchEvent may be called to read the coordinate value (X, Y) in Event, and the coordinate value of the touch point of the touch medium on the screen may be acquired with reference to the following code segment:

```
Public boolean onTouchEvent(MotionEvent event)
{
//acquiring the touch coordinate
floatx=event.getX( );
floaty=event.getY( );
...;
}
```

When the user uses the touch screen device, the touch point of the touch medium on the screen usually is the content currently operated by the user. After the coordinate value of the touch point is acquired, a target region corresponding to the touch point is acquired according to the position of the touch point on the touch screen. The size and the shape of the target region may be set as needed as long as the touch point is included in the target region (i.e., the content in the target region includes the content corresponding to the touch point (e.g., a certain application or a link corresponding to the touch point or the like)). In this embodiment, the target region acquired on the screen is a circular target region taking the touch point as an origin and having a defined radius. The radius of the circular target region may be set as needed, for example, may be 100 Pixel, and of course, may also be 150 Pixel; and additionally, the range of the circular target region may be set as needed by the user, and the present disclosure has no limitation on this. After the circular target region is acquired, a bitmap of the circular target region is acquired and enlarged at a scale that is set, and then the enlarged bitmap is displayed on the screen to cover the position of the touch point so as to zoom in the target region corresponding to the touch point. For the scale, the bitmap of the acquired target region may be zoomed in twice, and of course, may also be at other scales, for example, threefold or fivefold etc.; and of course, the scale may be adjusted by the user as needed.

Additionally, in the process of moving the touch medium on the screen, the target region on the screen that corresponds to the touch point of the touch medium is zoomed-in in real time. Specifically, after the target region that corresponds to the current touch point between the touch medium and the screen is zoomed in, if it is detected that the touch medium is moving on the screen(i.e., the touch medium still keeps in touch with the screen, but the touch point on the screen changes continually), then the target region corresponding to the touch point also changes with the position of the touch point changing. In this case, by acquiring the coordinate position of the touch point in real time, the target region corresponding to the current touch point is acquired in real time in the process of moving the touch medium on the screen, and the acquired target region is zoomed in in real time in the process of moving the touch medium on the screen. Furthermore, if another input trajectory consistent with the predetermined trajectory is acquired in the process where the touch medium keeps in touch with the screen, the zoom-in effect of the zoomed-in target region will become disappeared to restore the zoomed-in target region into a normal displaying state of the screen.

Step S104: detecting in the zoomed-in target region a touch-screen operation instruction.

Step S105: executing a corresponding operation according to the touch-screen operation instruction.

After the target region corresponding to the touch point is zoomed in, a touch-screen operation instruction is acquired according to the operation of the user on the touch screen so as to execute a corresponding operation according to the operation of the user on the touch screen. By zooming in the target region, the user can see the content on the screen corresponding to the touch point of the touch medium more clearly. Then, whether the content corresponding to the touch point is the content he or she needs to operate can be determined more accurately, thus executing a related corresponding operation. In this embodiment, when the user determines, according to the zoomed-in displaying target region, that the content corresponding to the touch point is just the target object that he or she needs to click, the user may not click the target object directly to start the target object, but simply remove the touch medium from the screen; and when the touch screen device detects that the touch point of the touch medium on the screen has disappeared (i.e., the touch screen device detects a touch-screen operation instruction indicating that the touch medium has left the screen), a related operation in the target region, which is triggered when the target object corresponding to the touch point before the touch medium leaves the screen is clicked, is executed so as to start the target object, thus further reducing the probability of clicking a wrong target by the user.

For example, when the user determines that a certain application corresponding to the touch point in the zoomed-in target region is just the application that he or she needs to click, the user may remove the touch medium from the screen. When the touch screen device detects that the touch point has disappeared from the screen, a related operation in the target region, which is triggered when the application corresponding to the touch point before the touch medium leaves the screen is clicked, is executed so as to start the application without the need of a manual click by the user. The related operation triggered after the target object is clicked varies with different target objects, and thus, the corresponding operation to be executed also varies. For example, when the target object corresponding to the touch point is a text displayed on the screen that are provided for the user to select when the user inputs texts through an input editor, the operation triggered after the text is clicked is to select the text for displaying at the input position on the screen, and in this case, the corresponding operation to be executed is to select the text for displaying at the input position on the screen.

Additionally, after the touch screen device detects the touch-screen operation instruction indicating that the touch medium has left the screen, the zoom-in effect in the zoomed-in target region disappears so as to restore the zoomed-in target region into a normal displaying state of the screen.

In this embodiment, by zooming in the target region that corresponds to the touch point between the touch medium and the screen, the user can see the content corresponding to the touch point more dearly so that whether the content corresponding to the touch point is the content that he or she needs to operate can be determined more accurately, thus reducing occurrences of mis-touches and the probability of clicking a wrong target by the user.

In other embodiments, the user may also trigger the touch screen device to execute the corresponding operation, which is triggered when the target object is clicked, through double clicks on the screen instead of removing the touch medium from the screen. For example, after the user determines that the target object in the zoomed-in target region corresponding to the touch point is just the target object that he or she needs to operate, the user may remove the touch medium from the screen firstly, After having detected that the medium disappears from the screen, the touch screen device still keeps the zoom-in effect of the target region; and at this time point, the target region is the target region on the screen that corresponds to the touch point of the touch medium before the touch medium leaves the screen. Afterwards, the user may double click the target object on the screen in the zoomed-in target region. After having received the user's double-click operation instruction, the touch screen device executes the corresponding operation, which is triggered when the target object is clicked, according to the double-click operation instruction, and restores the zoomed-in target region into a normal displaying state of the screen. Of course, the user may also execute other operations on the zoomed-in target region, for example, a single-click operation, or a dragging operation or the like, and the touch screen device executes a corresponding operation after detecting the related touch-screen operation instruction.

Figure 2:
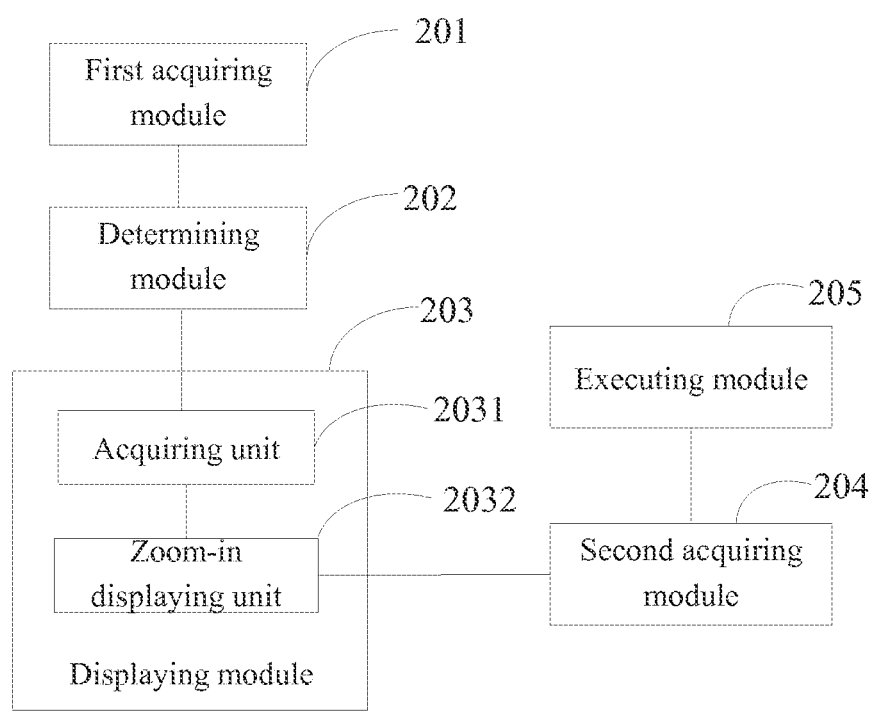
FIG. 2 is a schematic structural view illustrating an embodiment of a touch screen device of the present disclosure.

Referring to FIG. 2, in an embodiment of the touch screen device of the present disclosure, the touch screen device comprises a first acquiring module 201, a determining module 202, a displaying module 203, a second acquiring module 204 and an executing module 205. Preferably, the first acquiring module 201 is configured to acquire an input trajectory on the screen; the determining module 202 is configured to determine whether the input trajectory on the screen is consistent with a predetermined trajectory; the displaying module 203 is configured to zoom in a target region that corresponds to a current touch point between a touch medium and the screen when the determining module 202 determines that the input trajectory acquired is consistent with the predetermined trajectory; the second acquiring module 204 is configured to detect a touch-screen operation instruction in the zoomed-in target region; and the executing module 205 is configured to execute a corresponding operation according to the touch-screen operation instruction. Thereby, by zooming in the target region corresponding to the touch point, the user can see the content corresponding to the touch point more clearly so that whether the content corresponding to the touch point is the target object that he or she needs to operate user can be determined more accurately and a related screen operation can be executed accordingly, thus reducing occurrences of mis-touches and the probability of clicking a wrong target by the user.

Specifically, the displaying module 203 comprises an acquiring unit 2031 and a zoom-in displaying unit 2032. When it is determined that the input trajectory inputted by the user on the screen is consistent with the predetermined trajectory, the acquiring unit 2031 firstly acquires a coordinate position on the screen of the touch point of the touch medium, then acquires a circular target region on the screen that takes the touch point as an origin and has a defined radius, and acquires a bitmap of the circular target region (specifically, the bitmap of the circular target region may be copied). The zoom-in displaying unit 2032 zooms in the bitmap of the circular target region at a scale that is set and displays the zoomed-in bitmap of the circular target region on the screen so as to achieve the zoom-in purpose. Of course, the size and the shape of the target region corresponding to the touch point may also be set as needed. For example, the target region may be a circular target region that takes the coordinate of the touch point as an origin and has a set radius of 100 pixels or 200 pixels, and may also be a square target region that takes the coordinate of the touch point as an center point as long as the touch point is included therein.

By zooming in the target region, the user can determine whether the content corresponding to the touch point is the target object to be operated more clearly according to the zoomed-in target region, thus executing the related screen operation. For example, when the user determines that the content in the zoomed-in circular target region is just the target object that he or she needs to click, the user may remove the touch medium from the screen, When the second acquiring module 204 detects the touch-screen operation instruction indicating that the touch medium has left the screen (i.e., detects that the touch point of the touch medium disappears from the screen), the executing module 205 executes the corresponding operation, which is triggered when a target object corresponding to the touch point before the touch medium leaves the screen is clicked, in the target region according to the touch-screen operation instruction indicating that the touch medium has left the screen, thus reducing the probability of clicking a wrong object by the user.

In other embodiments, it may also be that a double-click operation instruction for the target object in the zoomed-in target region is acquired to execute a related operation triggered by the double-click operation instruction. That is, when the target region is zoomed in and the user determines that the content in the zoomed-in target region is just the target object that he or she needs to click, the user may remove the touch medium from the screen. When detecting the disappearance of the touch point, the touch screen device still keeps the zoom-in effect of the target region, and then the user may double click or single click the target object in the zoomed-in target region. After the double-click or single-click operation instruction of the user is detected by the second acquiring module, the executing module executes the corresponding operation, which is triggered when the target object is clicked, according to the acquired double-click or single-click operation instruction.

Additionally, as the touch medium moves on the screen, the acquiring unit 2031 of the displaying module 203 acquires the touch point of the touch medium on the screen in real time so as to acquire the target region corresponding to the touch point in real time in the process of moving the touch medium on the screen (i.e., the target region changes with the touch point); and the zoom-in displaying unit 2032 zooms in the changed target region so as to zoom in the target region corresponding to the touch point in real time. Additionally, when another input trajectory consistent with the predetermined trajectory is acquired by the acquiring module 201 as the touch medium keeps in touch with the screen, the displaying module 203 restores the zoomed-in target region into a normal displaying state of the screen.

By zooming in the target region on the screen corresponding to the touch point of the touch medium in the touch screen device of the present disclosure, the user can see the content corresponding to the touch point more clearly so that whether the content corresponding to the touch point is the content that the user needs to operate can be determined more accurately so as to execute the related screen operation, thus reducing occurrences of mis-touches and the probability of clicking a wrong target by the user.

Furthermore, it is apparent to those skilled in the art, the present disclosure also provides a touch screen device, which comprises a non-transitory program storage medium and a processor. The non-transitory program storage medium stores a program executed by the processor to perform the method as described in above, Furthermore, it is apparent to those skilled in the art that, various modules 201, 201, 203, 204, 205 and various units 2031, 2032 as shown in FIG. 2 are software modules or software units. In another aspect, it is well-known that various software modules and various software units inherently are stored in the non-transitory program storage medium and executed by the processor to perform the related functions respectively.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. An operation method of a touch screen with a zooming-in function, comprising:
   acquiring an input trajectory on the screen;
   determining whether the input trajectory is consistent with a predetermined trajectory;
   zooming in a target region that corresponds to a current touch point between a touch medium and the screen if the determination result is "yes", wherein the target region comprises an application or a link corresponding to the touch point;
   detecting in the zoomed-in target region a touch-screen operation instruction indicating that the touch medium is leaving the screen; and
   executing a corresponding operation in the target region according to the touch-screen operation instruction indicating that the touch medium is leaving the screen, to start the application or the link in the target region without manually clicking the application or the link;

wherein the step of zooming in a target region that corresponds to a current touch point between the a touch medium and the screen, comprises:
acquiring a circular target region that takes the touch point as an origin and has a preset radius on the screen, and acquiring a bitmap of the circular target region; and
zooming in the bitmap of the circular target region at a preset scale and displaying the bitmap.

2. The method of claim 1 wherein after the step of zooming in a target region that corresponds to a current touch point between the a touch medium and the screen, the method further comprises:
changing the target region with the change of the touch point between the touch medium and the screen as the touch medium moves on the screen, and zooming in the changed target region.

3. The method of claim 1, wherein after the step of zooming in a target region that corresponds to a current touch point between the touch medium and the screen, the method further comprises:
restoring the zoomed-in target region into a normal displaying state of the screen when another input trajectory consistent with the predetermined trajectory is acquired as the touch medium keeps in touch with the screen.

4. An operation method of a touch screen with a zooming-in function, comprising:
acquiring an input trajectory on the screen;
determining whether the input trajectory is consistent with a predetermined trajectory;
zooming in a target region that corresponds to a current touch point between a touch medium and the screen if the determination result is "yes", wherein the target region comprises an application or a link corresponding to the touch point;
detecting a touch-screen operation instruction in the zoomed-in target region; and
executing a corresponding operation according to the touch-screen operation instruction, wherein the touch-screen operation instruction is an instruction for indicating that the touch medium is leaving the screen, and the executed corresponding operation is starting the application or the link in the target region without manually clicking the application or the link.

5. The method of claim 4, wherein:
the step of detecting a touch-screen operation instruction in the zoomed-in target region, comprises:
detecting in the zoomed-in target region the touch-screen operation instruction indicating that the touch medium is leaving the screen;
the step of executing a corresponding operation according to the touch-screen operation instruction, comprises:
executing a corresponding operation, which is triggered when a target object corresponding to the touch point before the touch medium leaves the screen is clicked, in the target region according to the touch-screen operation instruction indicating that the touch medium is leaving the screen.

6. The method of claim 4, wherein the step of zooming in a target region that corresponds to a current touch point between a touch medium and the screen, comprises:
acquiring a circular target region that takes the touch point as an origin and has a preset radius on the screen, and acquiring a bitmap of the circular target region; and
zooming in the bitmap of the circular target region at a preset scale and displaying the bitmap.

7. The method of claim 4, wherein after the step of zooming in a target region that corresponds to a current touch point between a touch medium and the screen, the method further comprises:
changing the target region with the change of the touch point between the touch medium and the screen as the touch medium moves on the screen, and zooming in the changed target region.

8. The method of claim 4, wherein after the step of zooming in a target region that corresponds to a current touch point between a touch medium and the screen, the method further comprises:
restoring the zoomed-in target region into a normal displaying state of the screen when another input trajectory consistent with the predetermined trajectory is acquired as the touch medium keeps in touch with the screen.

9. A touch screen device with a zooming-in function, comprising:
a first acquiring module, being configured to acquire an input trajectory on the screen;
a determining module, being configured to determine whether the input trajectory is consistent with a predetermined trajectory;
a displaying module, being configured to zoom in a target region that corresponds to a current touch point between a touch medium and the screen if the determination result is "yes", wherein the target region comprises an application or a link corresponding to the touch point;
a second acquiring module, being configured to detect a touch-screen operation instruction in the zoomed-in target region; and
an executing module, being configured to execute a corresponding operation according to the touch-screen operation instruction, wherein the touch-screen operation instruction is an instruction for indicating that the touch medium is leaving the screen, and the executed corresponding operation is starting the application or the link in the target region without manually clicking the application or the link.

10. The touch screen device of claim 9, wherein:
the second acquiring module is configured to detect in the zoomed-in target region a touch-screen operation instruction indicating that the touch medium is leaving the screen; and
the executing module is configured to execute a corresponding operation, which is triggered when a target object corresponding to the touch point before the touch medium leaves the screen is clicked, in the target region according to the touch-screen operation instruction indicating that the touch medium is leaving the screen.

11. The touch screen device of claim 9, wherein the displaying module comprises:
an acquiring unit, being configured to acquire a circular target region that takes the touch point as an origin and has a preset radius on the screen, and acquiring a bitmap of the circular target region; and
a zoom-in displaying unit, being configured to zoom in the bitmap of the circular target region at a preset scale and display the bitmap.

12. The touch screen device of claim 9, wherein:
the target region changes with the change of the touch point between the touch medium and the screen as the touch medium moves on the screen, and the displaying module is configured to zoom in the changed target region.

13. The touch screen device of claim 9, wherein:
the displaying module restores the zoomed-in target region into a normal displaying state of the screen when another input trajectory consistent with the predetermined trajectory is acquired as the touch medium keeps in touch with the screen.

\* \* \* \* \*